United States Patent
Georgis

(10) Patent No.: US 10,497,258 B1
(45) Date of Patent: Dec. 3, 2019

(54) VEHICLE TRACKING AND LICENSE PLATE RECOGNITION BASED ON GROUP OF PICTURES (GOP) STRUCTURE

(71) Applicant: SONY CORPORATION, Tokyo (JP)

(72) Inventor: Nikolaos Georgis, San Diego, CA (US)

(73) Assignee: SONY CORPORATION, Tokyo (KP)

( * ) Notice: Subject to any disclaimer, the term of this patent is extended or adjusted under 35 U.S.C. 154(b) by 0 days.

(21) Appl. No.: 16/126,669

(22) Filed: Sep. 10, 2018

(51) Int. Cl.
  *G08G 1/017* (2006.01)
  *G06K 9/32* (2006.01)
  *G06T 7/292* (2017.01)

(52) U.S. Cl.
  CPC ......... *G08G 1/0175* (2013.01); *G06K 9/325* (2013.01); *G06T 7/292* (2017.01)

(58) Field of Classification Search
  CPC ....... G08G 1/0175; G06T 7/292; G06K 9/325
  See application file for complete search history.

(56) References Cited

U.S. PATENT DOCUMENTS

| | | | | |
|---|---|---|---|---|
| 4,812,810 A | * | 3/1989 | Query | F25D 29/008 250/227.22 |
| 2002/0021756 A1 | * | 2/2002 | Jayant | G06T 3/403 375/240.16 |
| 2006/0050788 A1 | * | 3/2006 | Techmer | G06K 9/228 375/240.12 |
| 2010/0322306 A1 | * | 12/2010 | Au | H04N 19/176 375/240.03 |
| 2013/0044219 A1 | * | 2/2013 | Burry | G08G 1/0175 348/149 |
| 2014/0201064 A1 | * | 7/2014 | Jackson | G08G 1/0175 705/38 |
| 2014/0336848 A1 | * | 11/2014 | Saund | G08G 1/054 701/3 |
| 2014/0340427 A1 | * | 11/2014 | Baker | G06T 3/0062 345/641 |
| 2014/0341424 A1 | * | 11/2014 | Reiter | G06T 7/246 382/103 |
| 2015/0172056 A1 | * | 6/2015 | Meunier | G06K 9/00577 380/28 |
| 2016/0040469 A1 | * | 2/2016 | Lietz | E05F 15/668 49/13 |
| 2016/0232410 A1 | * | 8/2016 | Kelly | G06K 9/00711 |
| 2017/0300786 A1 | * | 10/2017 | Gope | G06K 9/00791 |

FOREIGN PATENT DOCUMENTS

CN   105869117 A   8/2016

\* cited by examiner

*Primary Examiner* — Fekadeselassie Girma
(74) *Attorney, Agent, or Firm* — Chip Law Group

(57) ABSTRACT

An electronic device includes an image sensor that captures a sequence of image frames that includes a plurality of different vehicles. The electronic device further includes control circuitry configured to identify a first group of frames from the captured sequence of image frames that belong to a first vehicle. A first bounding box is generated on a first vehicle region within a first frame of the identified first group of frames. A first license plate region of the first vehicle is detected within the first bounding box in the first frame and within a specific area in subsequent frames of the identified first group of frames, based on a reference of the spatial position of the first bounding box of the first vehicle in the first frame. At least the first vehicle is tracked based on the detected first license plate region of the first vehicle.

19 Claims, 6 Drawing Sheets

VEHICLE TRACKING AND LICENSE PLATE RECOGNITION BASED ON GROUP OF PICTURES (GOP) STRUCTURE

CROSS-REFERENCE TO RELATED APPLICATIONS/INCORPORATION BY REFERENCE

None.

FIELD

Various embodiments of the disclosure relate to vehicle tracking and license plate recognition. More specifically, various embodiments of the disclosure relate to an electronic device for vehicle tracking and license plate recognition based on group-of-pictures (GOP) structure.

BACKGROUND

Recent advancements in the field of object detection have led to development of various methods and techniques for vehicle tracking in live videos. In conventional systems, a conventional electronic device may track a vehicle in a captured video by a brute force object detection approach. In the brute force object detection approach, the conventional electronic device may be configured to apply an object detection technique on each image frame of the video to detect a position of the vehicle in the respective image frame of the captured video. The conventional electronic device may be configured to track the vehicle in the captured video, based on a detection of the position of the vehicle in each image frame of the captured video. In cases where the captured video is a high definition (HD) video, the captured video may have a large number of image frames per second. In such cases, the conventional electronic device may be required to apply the object detection technique on each image frame of the captured HD video, in real time, to track the vehicle in the captured video. Application of the object detection technique on each of the large number of image frames of the captured video, in real-time or near real-time, may be a computationally resource intensive process. Further, existing automatic license plate recognition systems from a video using conventional optical character recognition or object detection techniques may be a very slow and an error prone process.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device for vehicle tracking and license plate recognition based on group-of-pictures (GOP) structure, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Various embodiments of the present disclosure may be found in an electronic device for accurate and efficient vehicle tracking and license plate recognition based on a GOP structure. In conventional systems, a conventional electronic device may track a vehicle in a captured video by a brute force object detection approach. In the brute force object detection approach, the conventional electronic device may be configured to apply an object detection technique on each image frame of the video to detect a position of the vehicle in the respective image frame of the captured video. In contrast to conventional systems, the disclosed electronic device may be configured to group a defined number of frames from the sequence of image frames in a plurality of group of frames (i.e., a GOP structure). The grouping may be done to include a vehicle region of a same vehicle. The GOP structure may include "I" and "P" frames, where the "I" frames are independent frames and do not use data points from previous or any subsequent frames for any operation, whereas "P" frames can use data from previous frames. In context of the disclosed electronic device, the first frame of each group of frames of the plurality of group of frames may be considered an "I" frame, which is subjected to both vehicle region detection and license plate region detection. All subsequent frames may be considered the "P" frame of the first group of frames, which may be subjected to only license plate region detection by inference of bounding box position from a previous frame. All subsequent frames, i.e., frames captured after the first frame, and grouped in one group, such a first group of frames, may not be subjected to vehicle detection repeatedly. Thus, the "I" frames are executed when needed whereas P-frame inference can significantly optimize execution. This provides a significant savings in processing time for artificial neural networks, such as deep learning networks, processing pipeline enabling real time or near real time accurate license plate recognition.

Further, instead of applying license plate detection in an entire image frame of a live video, only certain specific area, such as area within a vehicle bounding box, is searched for license plate detection. As a result of license plate detection from bounding box generated on vehicle regions while ignoring remaining pixels outside the bounding box, license plate detection and recognition may be significantly faster and accurate as compared to conventional systems.

Figure 1:
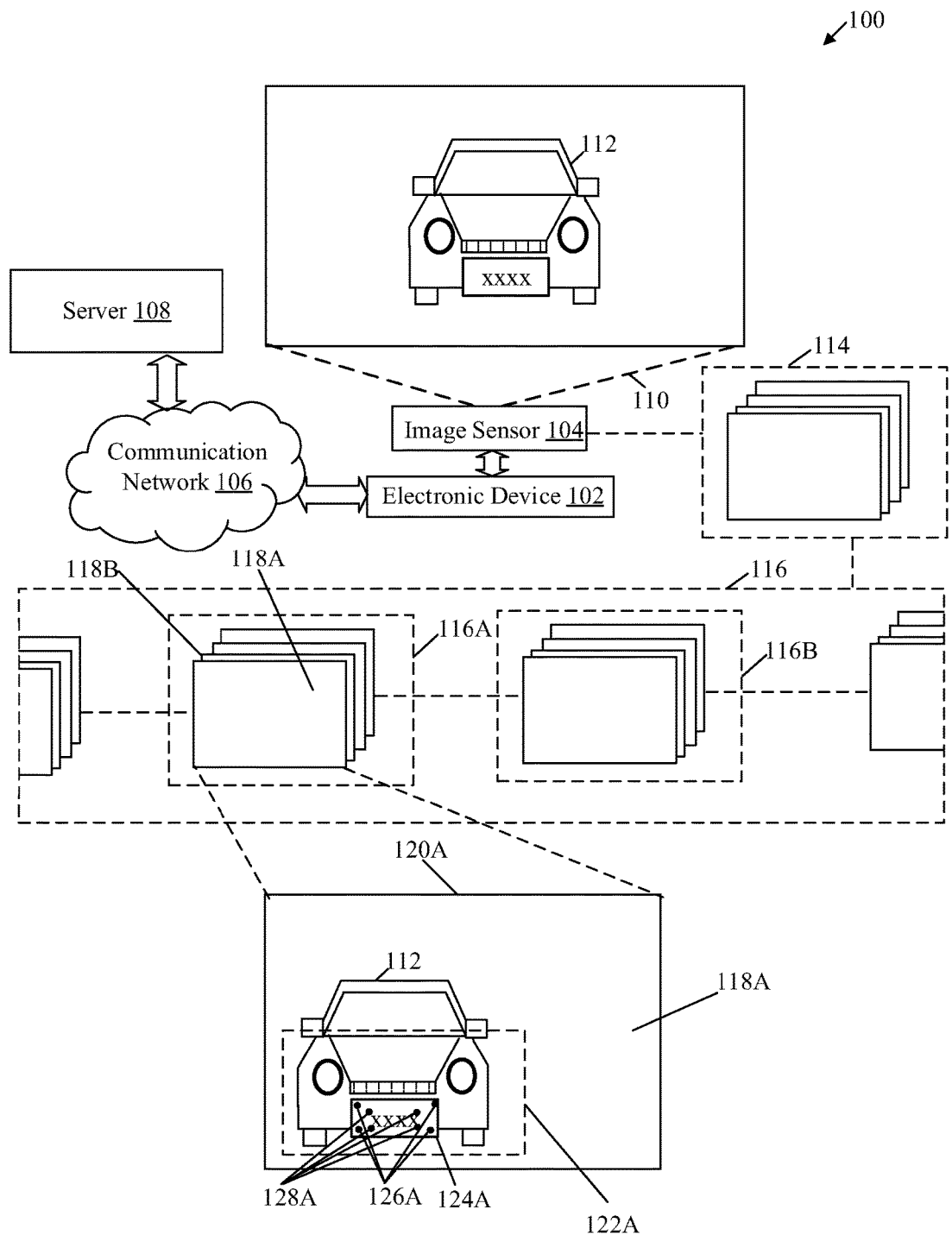
FIG. 1 is a block diagram that illustrates an exemplary environment for an electronic device for vehicle tracking and license plate recognition based on group-of-pictures (GOP) structure, in accordance with an embodiment of the disclosure.

FIG. 1 is a block diagram that illustrates an exemplary environment for vehicle tracking and license plate recognition based on a GOP structure, in accordance with an embodiment of the disclosure. With reference to FIG. 1, there is shown a network environment 100 comprising an electronic device 102, an image sensor 104, a communication network 106, and a server 108. In some embodiments, the electronic device 102 may be communicatively coupled to the image sensor 104. In some embodiments, the image sensor 104 may be a component of the electronic device 102.

The electronic device 102 may include suitable logic, circuitry, interfaces, and/or code that may be configured to detect a plurality of vehicle regions of the plurality of different vehicles within a sequence of image frames, such as a live video of a road portion. The electronic device 102 may be configured to group a defined number of frames from the sequence of image frames in a plurality of group of frames (i.e., a GOP). The grouping may be done to include a vehicle region of a same vehicle. The electronic device 102 may then detect a license plate region of a corresponding vehicle within a bounding box on the vehicle region in a first frame of each group of frames. Thus, instead of applying license plate detection in entire image frame of a live video, only certain specific area, such as area within a vehicle bounding box, is searched for license plate detection. As a result of license plate detection from bounding box generated on vehicle regions while ignoring remaining pixels outside the bounding box, license plate detection and recognition are significantly faster and accurate. This provides a significant savings in processing time for artificial neural networks, such as deep learning networks, processing pipeline enabling real time or near real time accurate license plate recognition. The electronic device 102 may further include suitable logic, circuitry, interfaces, and/or code that may be associated with a convolutional neural network (CNN) based pattern recognition model. Examples of the electronic device 102 may include, but are not limited to a vehicle tracker device, an Automatic License Plate Recognition (ALPR) device, an in-vehicle embedded device, an electronic control unit (ECU) or a head unit (HU) of a vehicle, a handheld computer, a cellular/mobile phone, and other computing devices.

The image sensor 104 may include suitable logic, circuitry, interfaces, and/or code that may be configured to capture a sequence of image frames, such as a video. Examples of the sequence of image frames may include High Dynamic Range (HDR) images, High Definition (HD) video, 4K video, a RAW image, or images or video in other formats including downgraded images or videos. The image sensor 104 may be configured to communicate the captured sequence of image frames as input to the electronic device 102 for processing. The image sensor 104 may include a lens assembly that may enable capture of the sequence of image frames from a field-of-view 110 of the image sensor 104. The image sensor 104 may be implemented by use of a charge-coupled device (CCD) technology or complementary metal-oxide-semiconductor (CMOS) technology. Examples of implementations of the image sensor 104 may include a front camera, a driving camera, a 360 degree camera, a straight camera, a side camera, a closed circuitry television (CCTV) camera, a stationary camera, an action cam, a video camera, or an angled camera. The image sensor 104 may be implemented as an integrated unit of the electronic device 102 or as a separate device (e.g., a camera device mounted on a vehicle).

The communication network 106 may include a medium through which the electronic device 102 may communicate with the server 108 or the image sensor 104. Examples of the communication network 106 may include, but are not limited to, the Internet, a cloud network, a Long Term Evolution (LTE) network, a Wireless Local Area Network (WLAN), a Local Area Network (LAN), a telephone line (POTS), or other wired or wireless network. Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

The server 108 may include suitable circuitry, interfaces, and/or code that may be configured to train one or more neural network models, for example, recurrent neural network (RNN), such as Long Short Term Memory networks (LSTM) networks, CNN, deep neural network, or an artificial neural network that may be a combination of the RNN and CNN networks. For example, a first neural network model may be trained for vehicle region detection, a second network model may be trained for license plate region detection from the vehicle bounding boxes, a third model may be trained to automatically define length of the groups of frames or simply to group the frames in GOP structure from the captured sequence of image frames. The trained model(s) may then be deployed in in the electronic device 102 for real time or near real time vehicle tracking and license plate recognition. For example, such electronic device 102 may find application in hotlist based automated license plate recognition. In some embodiments, the server 108 may be configured to communicate with the electronic device 102 via the communication network 106. Examples of the server 108 may include, but are not limited to, an application server, a cloud server, a web server, a database server, a file server, a mainframe server, or a combination thereof.

In operation, the image sensor 104 may be configured to capture a sequence of image frames 114 that includes a plurality of different vehicles from the field-of-view 110 of the image sensor 104. In one example, the sequence of image frames 114 may be a live video of a road portion that includes the plurality of different vehicles, such as a first vehicle 112. Examples of the first vehicle 112 may include but is not limited to a car, a bike, a truck, a bus, or other vehicles.

In some embodiments, electronic device 102 may be configured to receive a first hotlist of vehicles comprising at least a set of license plate identifiers of a set of vehicles. A hotlist of vehicles, such as the first hotlist of vehicle, may be a data file received from a law enforcement entity. The hotlist of vehicles may include a defined number of license plate identifiers (e.g., vehicle license plate numbers), of certain suspect vehicles, stolen license plates, stolen vehicles, vehicles of wanted persons, and other vehicles or persons sought by the law enforcement entity. In some embodiments, the electronic device 102 may periodically extract the hotlist of vehicles, at different time of day for up-to-date list.

The electronic device 102 may be configured to group the sequence of image frames 114 into a plurality of groups of frames 116. For example, the electronic device 102 may be configured to segregate the sequence of image frames 114 to the plurality of groups of frames 116 based on a group-ofpictures (GOP) based structure. Each group of the plurality of groups of frames 116 may include a specified number of image frames.

In accordance with an embodiment, the electronic device 102 may be configured to detect a plurality of vehicle regions of the plurality of different vehicles within the captured sequence of image frames 114. The electronic device 102 may be configured to identify a first group of frames 116A from the captured sequence of image frames 114 that belong to the first vehicle 112 of the plurality of different vehicles. A new group of frames, such as a second group of frames 116B, may include a vehicle region of a second vehicle that is different than the first vehicle 112, or a new group of frames that includes the same vehicle, such as the first vehicle 112. The length of the GOP structure (i.e., the group of frames) may be dynamically changed or tuned based on a given situation. For example, for a slow-moving car or a stationary car, the number of image frames in a group may be larger than a fast-moving car. Further, grouping of frames based on vehicles may be faster and more accurate than grouping of frames based on license plate regions. Also, as the vehicle region is wider than a license plate region, more overlap among detected vehicle regions is possible among consecutive frames of each group of frames in the GOP structure. Further, more numbers of frames may be grouped when detected vehicle regions is used as a basis for grouping than grouping based on license plate region detection.

In accordance with an embodiment, the electronic device 102 may be configured to apply an object detection technique on a first frame 118A to detect a first vehicle region of the first vehicle 112 in the first frame 118A. A magnified view 120A of the first frame 118A is shown in FIG. 1. Examples of the applied object detection technique may include but are not limited to a deep learning based object detection technique, a feature-based object detection technique, an image segmentation based object detection technique, a blob analysis-based object detection technique, a "you look only once" (YOLO) object detection technique, a single-shot multi-box detector (SSD) based object detection technique, or a shallow CNN based object detection technique. In certain scenarios, the electronic device 102 may be configured to apply the object detection technique on the first frame 118A, by use of a pre-trained neural network that may detect cars or other vehicles. In such scenarios, the neural network-based object recognition model may be pre-trained on a plurality of vehicle image models. The electronic device 102 may be configured to generate a first bounding box 122A on the first vehicle region within the first frame 118A of the identified first group of frames 116A. The first bounding box 122A may be indicative of a spatial position of the first vehicle 112 in the first frame 118A. The first vehicle region may be the region of interest, which may be bounded by the first bounding box 122A. Examples of a shape of the generated first bounding box 122A may include, but is not limited to a rectangle, a square, a circle, a trapezoid, or any irregular shape.

In accordance with an embodiment, the electronic device 102 may be configured to apply the object detection technique only on the first frame 118A to detect the first vehicle region of the first vehicle 112 in the first group of frames 116A. All subsequent frames, i.e., frames captured after the first frame 118A, and grouped in one group, such the first group of frames 116A, may not be subjected to vehicle detection repeatedly, whereas all frames in one group may be subjected to license plate region detection. The electronic device 102 may be configured to a detect a first license plate region 124A of the first vehicle 112 only within the first bounding box 122A in the first frame 118A. Image pixels outside the first bounding box 122A may be ignored for license plate region detection processing. The electronic device 102 may be further configured to detect the first license plate region 124A of the first vehicle 112 within a specific area in subsequent frames (e.g., $2^{nd}$, $3^{rd}$, . . . , N frames) of the identified first group of frames 116A, based on a reference of the spatial position of the first bounding box 122A of the first vehicle 112 in the first frame 118A.

The electronic device 102 may be configured to find the first license plate region 124A only within the specific area, such as bounding boxes of the first vehicle 112, in subsequent frames of the identified first group of frames 116A in a batch. Such first license plate region 124A may be located based on resemblance between the first license plate region 124A of the first frame 118A and license plate regions within the specific area in subsequent frames, such as a second frame 118B, of the identified first group of frames 116A, using a trained neural network model (e.g., a regression based neural network model). Examples of the regression-based neural network model or pattern detection technique may include, but is not limited to a Gaussian process regression based pattern recognition, a linear regression based pattern recognition, a CNN based pattern recognition, or a deep learning based pattern recognition. The electronic device 102 may be configured to generate a first set of points 126A demarked at four corners of the license plate of the first vehicle 112 within the first bounding box 122A in the first frame 118A and the specific area in subsequent frames, such as the second frame 118B, of the identified first group of frames 118A. The first set of points 126A demarked at four corners of the first license plate of the first vehicle 112 indicates the detected first license plate region 124A. In some embodiments, the electronic device 102 may be configured to generate a second set of points 128A within the first set of points 126A. The second set of points 128A may be demarked within the first set of points 126A for tight crop, i.e., to encapsulate alphanumeric characters, from the first license plate region 124A, of the first vehicle 112.

The electronic device 102 may be configured to compare a position of each point of the first set of points 126A in the first frame 118A with a corresponding position of each point of corresponding first set of points in the second frame 118B of the identified first group of frames 116A, based on a specified planar point matching technique or defined coplanarity constraint rules. The electronic device 102 may be configured to determine an affine transformation function based on a difference between the position of each point of the first set of points 126A in the first frame 118A and the corresponding position of each point of the corresponding first set of points in the second frame 118B.

In accordance with an embodiment, the electronic device 102 may be configured to update the spatial position of the first bounding box 122A of the first vehicle 112 for the second frame 118B of the identified first group of frames 116A. The update may be executed based on the detected first license plate region 124A of the first vehicle 112 in the second frame 118B of the identified first group of frames 116A and the affine transformation function.

The electronic device 102 may be configured to extract, by optical character recognition (OCR), a first license plate number (e.g., ABCD 16) from the detected first license plate region 124A (e.g., area within the first set of points 126A or the second set of points 128A (tight crop)) of the first vehicle 112 from the first frame 118A. Similarly, the electronic device 102 may be configured to extract, by OCR, a second license plate number from the detected first license plate region 124A of the first vehicle 112 from the second frame 118B of the identified first group of frames 116A. The electronic device 102 may be further configured to verify that the first bounding box 122A and the detected first license plate region 124A belongs to a same vehicle, such as the first vehicle 112, based on a comparison of the extracted OCR results for the first frame 118A and the second frame 118B. In other words, the OCR results enables cross-validate the license plate regions and vehicle bounding boxes for each group of the plurality of group of frames.

In accordance with an embodiment, the electronic device 102 may be configured to validate that the extracted first license plate number (e.g., ABCD 16) from the detected first license plate region 124A of the first vehicle 112 is one of the set of license plate identifiers in the received first hotlist of vehicles. In such cases, the electronic device 102 may be configured to output an alert for a law enforcement user in a real time or a near-real time in response to the validation.

In conventional systems, in order to extract the first license plate number from the first frame 118A, the conventional electronic device may be configured to apply the OCR technique on each region of the first frame 118A. In contrast to the conventional systems, the electronic device 102 may be configured to apply the OCR technique only on the area within the first set of points 126A or the second set of points 128A in the first frame 118A. Application of the OCR technique only on the specific region may require less computational resources in comparison with application of the OCR technique on each region of the first frame 118A, and subsequent image frames.

Figure 2:
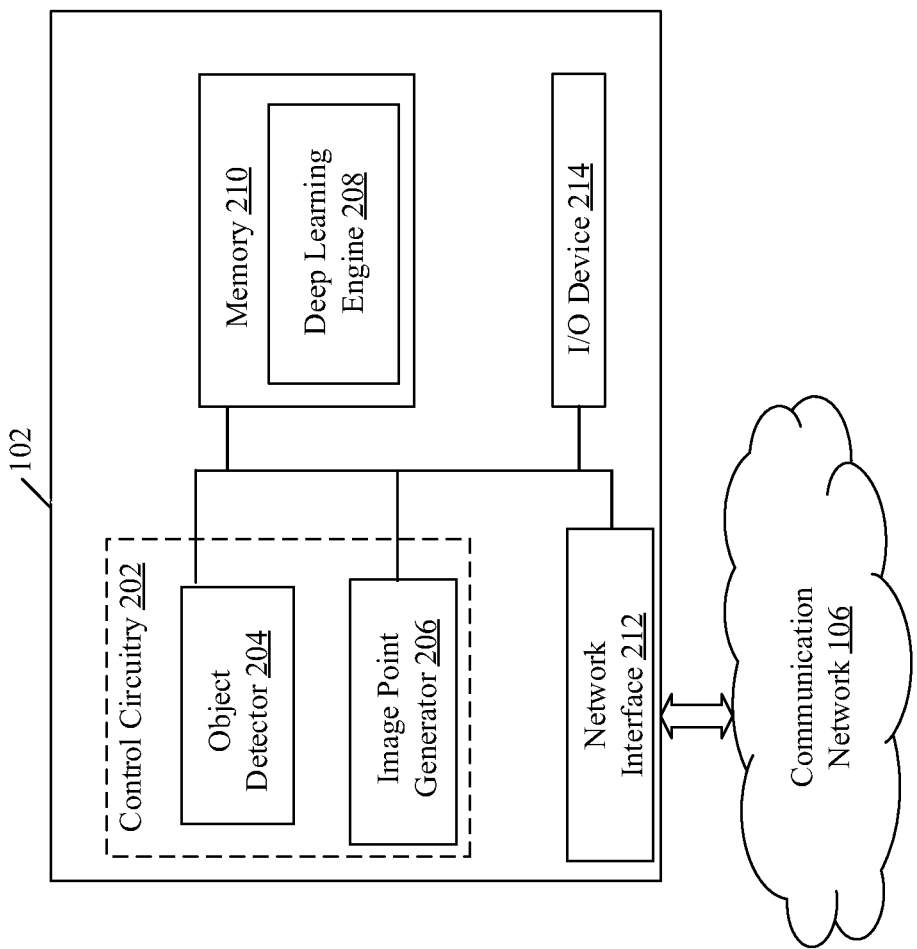
FIG. 2 is a block diagram that illustrates an exemplary an electronic device for vehicle tracking and license plate recognition based on GOP structure, in accordance with an embodiment of the disclosure.

FIG. 2 is a detailed block diagram that illustrates an electronic device for vehicle tracking, in accordance with an embodiment of the disclosure. FIG. 2 is explained in conjunction with elements from FIG. 1. With reference to FIG. 2, the electronic device 102 comprises a control circuitry 202 comprising an object detector 204 and image point generator 206. The electronic device 102 further comprises a memory 210, a network interface 212, and an input/output (I/O device) 214. The memory 210 may be configured to store a deep learning engine 208. In some embodiments, the deep learning engine 208 may be a separate chip or circuitry to manage and implement one or more neural network models.

The control circuitry 202 may comprise suitable logic, circuitry, interfaces, and/or code that may be configured to execute a set of instructions stored in the memory 210. The control circuitry 202 may be configured to process the sequence of image frames 114. The control circuitry 202 may be configured to split the sequence of image frames 114 using the LSTM networks (i.e., using the deep learning engine 208) into a plurality of group of frames in the GOP structure. The first frame 118A of the first group of frames 116A may be considered an "I" frame, which is subjected to both vehicle region detection and license plate region detection. All subsequent frames of the first group of frames 116A may be subjected to only license plate region detection by inference of bounding box position/location from the previous frame, such as the first frame 118A. The control circuitry 202 may be configured to track the first vehicle 112 in the sequence of image frames 114 based on the GOP structure. Examples of the control circuitry 202 may include an Application-Specific Integrated Circuit (ASIC) processor, a Complex Instruction Set Computing (CISC) processor, and/or other hardware processors.

The object detector 204 may comprise suitable logic, circuitry, interfaces, and/or code that may be configured to generate the first bounding box 122A in the first frame 118A. Examples of implementations of the object detector 204 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The image point generator 206 may comprise suitable logic, circuitry, interfaces, and/or code that may be configured to generate the first set of points 126A demarked at four corners of each license plate region within each bounding box in the plurality of group of frames. Examples of implementations of the image point generator 206 may be a neural network circuitry, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 210 may comprise suitable logic, circuitry, and/or interfaces that may be operable to store a set of instructions executable by the control circuitry 202, the object detector 204, and the image point generator 206. The memory 210 may be configured to store the sequence of image frames 114 captured by the image sensor 104. The memory 210 may be configured to store the deep learning engine 208 that may be a pre-trained deep neural network model. The deep learning engine 208 may be configured to apply logical rules to the captured sequence of image frames 114 for grouping of the sequence of image frames 114, defining length of GOP, and deduce new information associated with the received hotlist of vehicles. Examples of implementation of the memory 210 may include, but are not limited to, Random Access Memory (RAM), Read Only Memory (ROM), Hard Disk Drive (HDD), and/or a Secure Digital (SD) card.

The network interface 212 may comprise suitable logic, circuitry, interfaces, and/or code that may be configured to enable communication between the electronic device 102, and the server 108 via the communication network 106. The network interface 212 may implement known technologies to support wired or wireless communication with the communication network 106. The network interface 212 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 212 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O device 214 may comprise suitable logic, circuitry, interfaces, and/or code that may be configured to receive a plurality of inputs from the user. The I/O device 214 may comprise various input and output devices that may be configured to communicate with the electronic device 102, the server 108, or other external data source. Examples of the input devices may include, but not limited to, a touch screen, a keyboard, a mouse, a microphone, and/or an image sensor. Examples of the output devices may include, but are not limited to, a display screen (such as a Liquid Crystal Display (LCD) or a Light Emitting Diode (LED) display) and/or a speaker.

Figure 3:
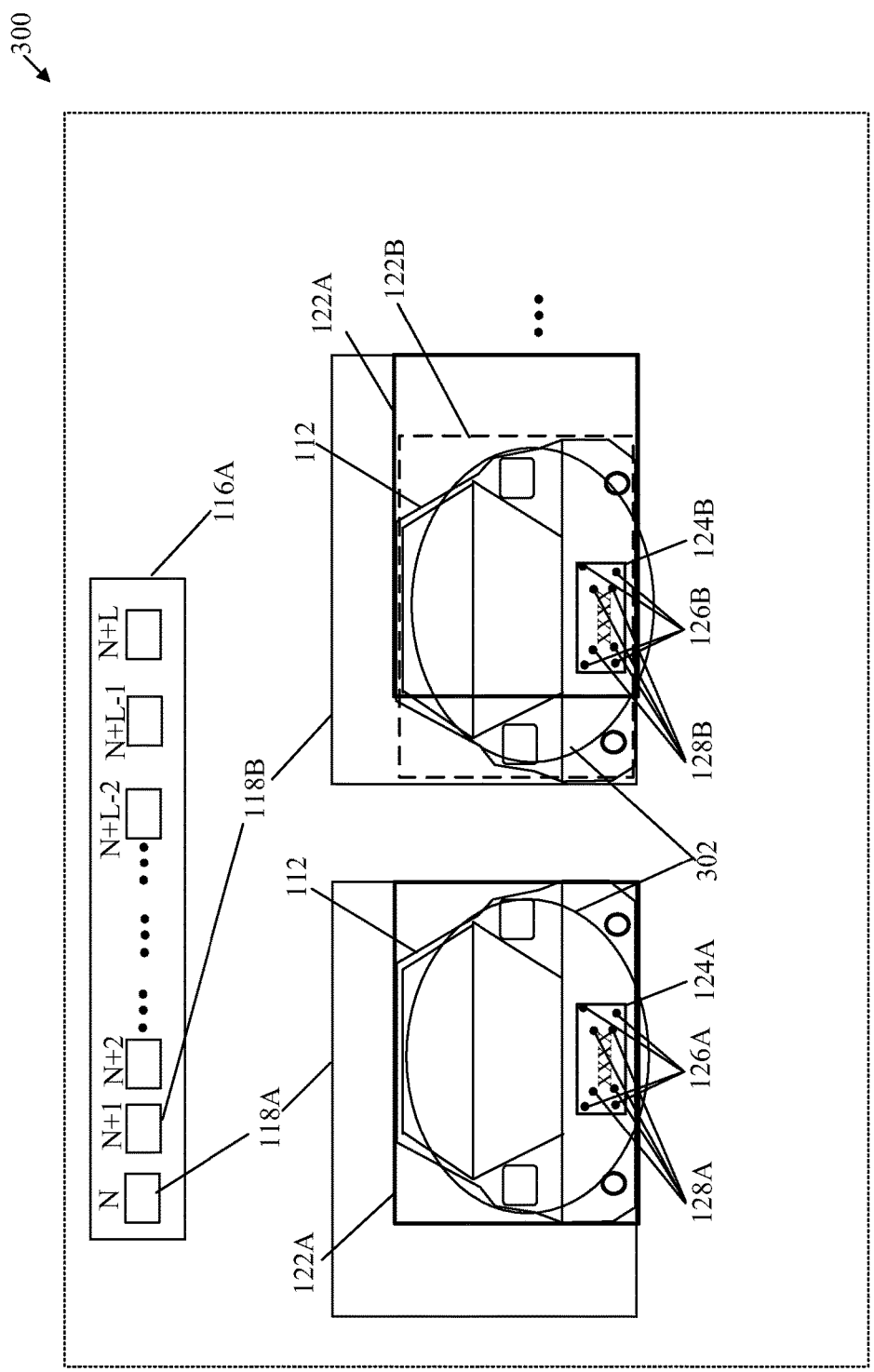
FIG. 3 illustrates a first exemplary scenario for implementation of electronic device for vehicle tracking and license plate recognition based on GOP structure, in accordance with an embodiment of the disclosure.

FIG. 3 illustrates an exemplary scenario for implementation of electronic device for vehicle tracking and license plate recognition, in accordance with an embodiment of the disclosure. FIG. 3 is explained in conjunction with elements from FIG. 1 and FIG. 2. With reference to FIG. 3, there is a scenario 300 that depicts processing of the first group of frames 116A of the plurality of group of frames 116 (FIG. 1) in a machine learning pipeline, such as the deep neural network pipeline using the deep learning engine 208.

The first frame 118A (e.g., Frame N) of the first group of frames 116A may be considered an "I" frame, which is subjected to both vehicle region detection and license plate region detection. All subsequent frames (e.g., Frame N+1, . . . , N+L, where "L" is the length of the GOP that indicates total number of frames in one group) may be considered the "P" frame of the first group of frames 116A, which may be subjected to only license plate region detection by inference of bounding box position from the previous frame. All subsequent frames, i.e., frames captured after the first frame 118A, and grouped in one group, such the first group of frames 116A, may not be subjected to vehicle detection repeatedly. The electronic device 102 may be configured to a detect the first license plate region 124A of the first vehicle 112 only within the first bounding box 122A in the first frame 118A. Image pixels outside the first bounding box 122A may be ignored for license plate region detection processing. The electronic device 102 may be further configured to detect the first license plate region 124A of the first vehicle 112 within a specific area in subsequent frames, such as the second frame 118B, of the identified first group of frames 116A, based on the reference of the spatial position of the first bounding box 122A in the second frame 118B.

In accordance with an embodiment, the electronic device 102 may be configured to update the spatial position of the first bounding box 122A of the first vehicle 112 for the second frame 118B of the identified first group of frames 116A. The updated spatial position of the first bounding box 122A is shown as bounding box 122B in the second frame 118B. The update may be executed based on the detected first license plate region 124A of the first vehicle 112 in the second frame 118B of the identified first group of frames 116A and an affine transformation function.

The electronic device 102 may be configured to generate the first set of points 126A demarked at four corners of the first license plate region 124A of the first vehicle 112 within the first bounding box 122A in the first frame 118A and the specific area in subsequent frames, such as the second frame 118B, of the identified first group of frames 118A. In some embodiments, the electronic device 102 may be configured to generate the second set of points 128A within the first set of points 126A. The second set of points 128A may be demarked within the first set of points 126A for tight crop, i.e., to encapsulate alphanumeric characters, from the first license plate region 124A, of the first vehicle 112.

The electronic device 102 may be configured to batch detect the first license plate region 124A only within the specific area, such as bounding boxes of the first vehicle 112, in subsequent frames of the identified first group of frames 116A in a batch. The batch detection may be executed based on resemblance between the first license plate region 124A of the first frame 118A and license plate regions, such as license plate region 124B, within the specific area in subsequent frames, such as the second frame 118B, of the identified first group of frames 116A, using a trained neural network model (e.g., a regression based neural network model).

The electronic device 102 may be configured to compare a position of each point of the first set of points 126A in the first frame 118A with a corresponding position of each point of corresponding first set of points 126B in the second frame 118B of the identified first group of frames 116A, based on a specified planar point matching technique or defined coplanarity constraint rules. The electronic device 102 may be configured to determine the affine transformation function based on a difference between the position of each point of the first set of points 126A in the first frame 118A and the corresponding position of each point of the corresponding first set of points 126B in the second frame 118B.

In some embodiments, the control circuitry 202 may be configured to compute a plurality of motion vectors based on a difference between a position of each point of the first set of points 126A in the first frame 118A, and a position of a corresponding point of the first set of points 126B of the second frame 118B. The electronic device 102 may be configured to determine the affine transformation function based on the computed plurality of motion vectors. In case of tight crop, similar to the first set of points 126A, the second set of points 128A of the first frame 118A and corresponding second set of points 128B of second frame 118B, may be compared for affine restoration.

The electronic device 102 may be configured to derive an ellipse of uncertainty 302 within the first bounding box 122A using at least a location of the first license plate region 124A in the first frame 118A. Thereafter, the electronic device 102 may be configured to track the first license plate region 124A of the first vehicle 112 within a specific area in subsequent frames, such as within bounding boxes of the first vehicle region, of the identified first group of frames 116A, further based on the derived ellipse of uncertainty such that the track of the first license plate region 124A within the specific area in subsequent frames may efficiently handle and may be independent of occlusion, image blur, or license plate edges artifacts.

The electronic device 102 may be configured to find the first license plate region 124A only within the specific area, such as bounding boxes of the first vehicle 112, in subsequent frames of the identified first group of frames 116A in a batch, based on a resemblance between the first license plate region 124A of the first frame 118A and license plate regions within the specific area in subsequent frames, such as a second frame 118B, of the identified first group of frames 116A, using a trained neural network model (e.g., a regression based neural network model). Thus, instead of applying license plate detection in entire image frame of a live video, only certain specific area, such as the area within a vehicle bounding box, is searched for license plate detection. As a result of license plate detection from bounding box generated on vehicle regions while ignoring remaining pixels outside the bounding box, license plate detection and recognition are significantly faster and accurate. This provides a significant savings in processing time for artificial neural networks, such as deep learning networks, and machine learning processing pipeline, especially in cases where the electronic device 102 is an embedded device, enabling real time or near real time accurate license plate recognition.

Figure 4A:
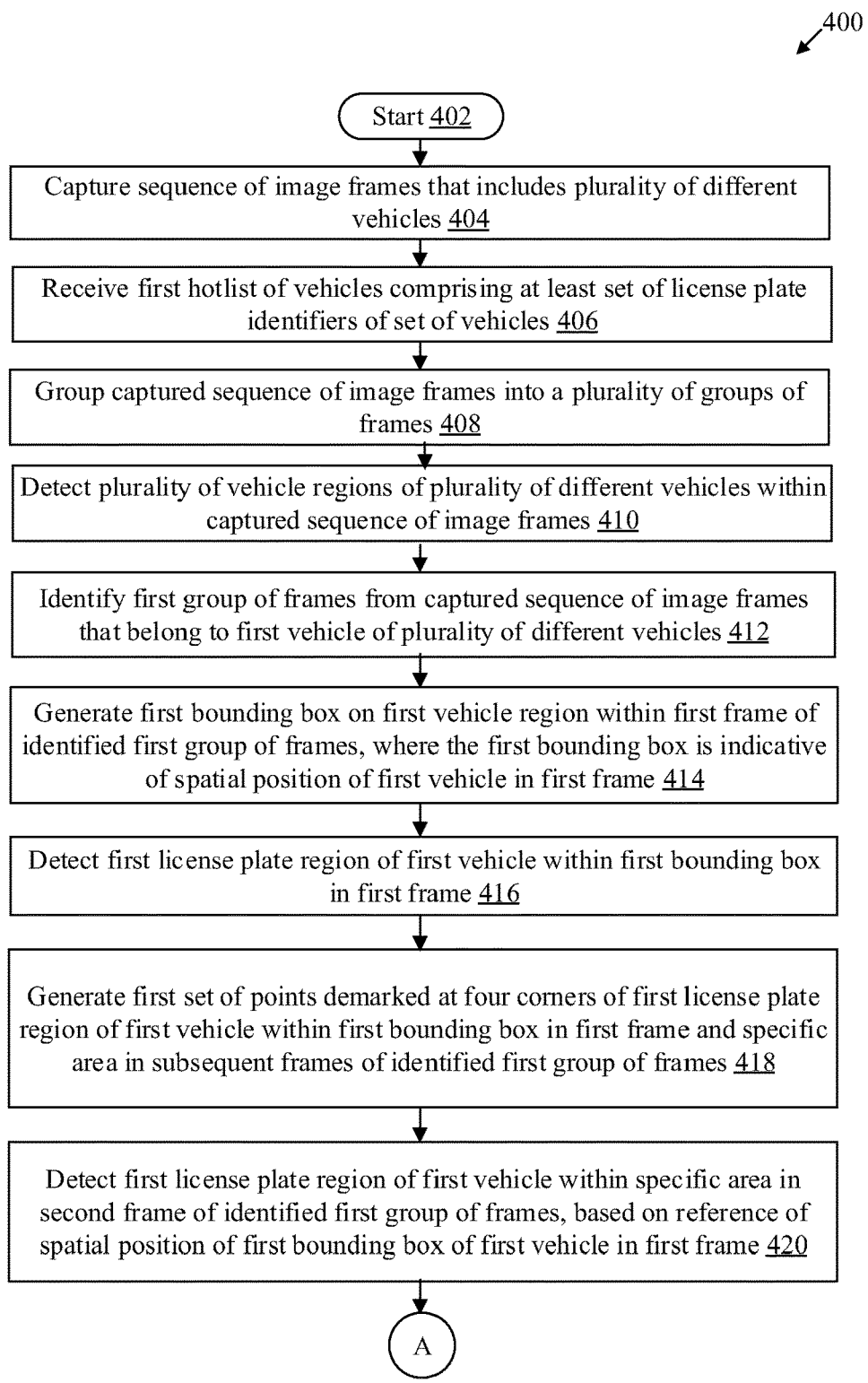
FIGS. 4A, 4B, and 4C collectively, depict a flowchart that illustrates an exemplary method for vehicle tracking and license plate recognition based on GOP structure, in accordance with an embodiment of the disclosure.
Figure 4B:
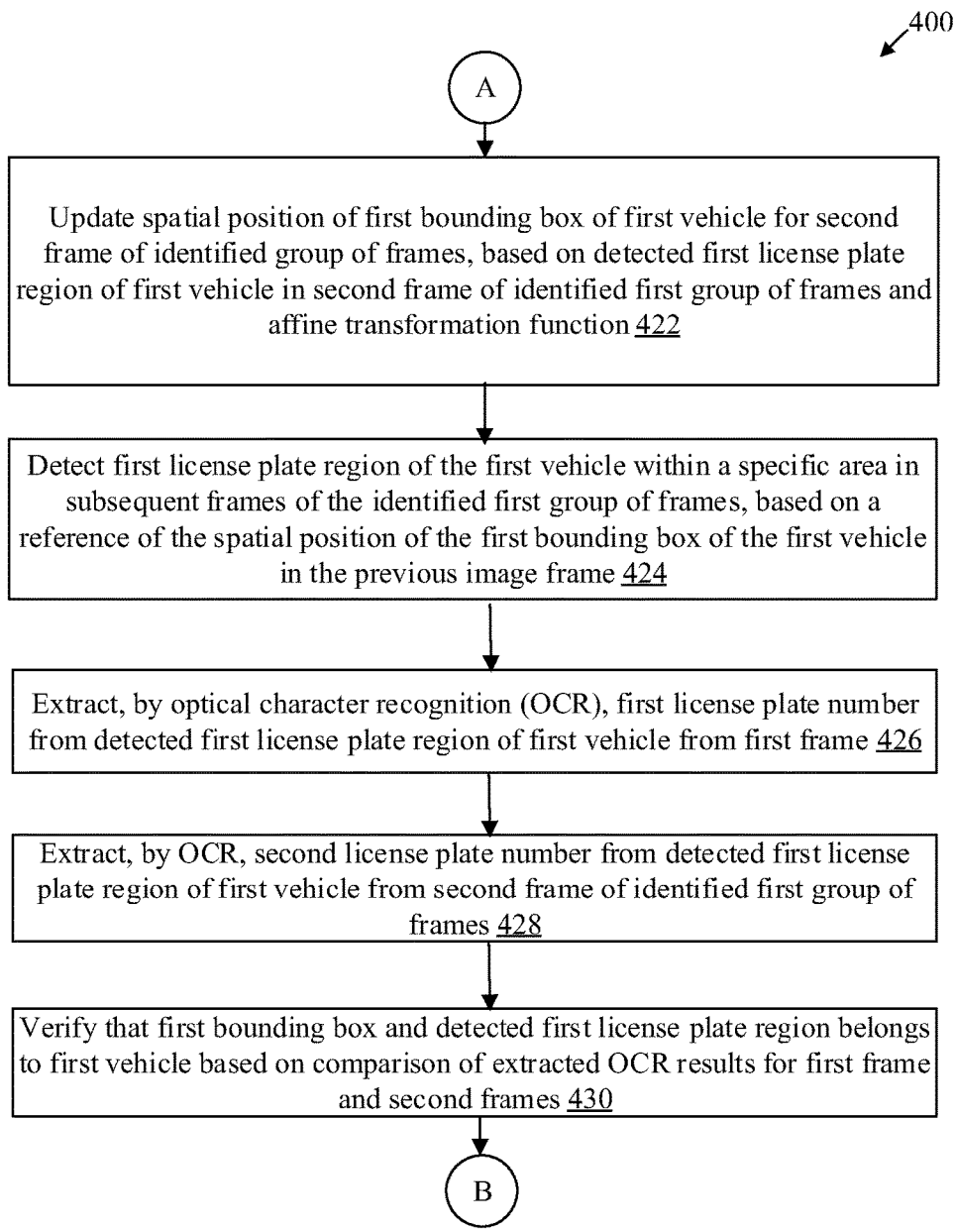
Figure 4C:
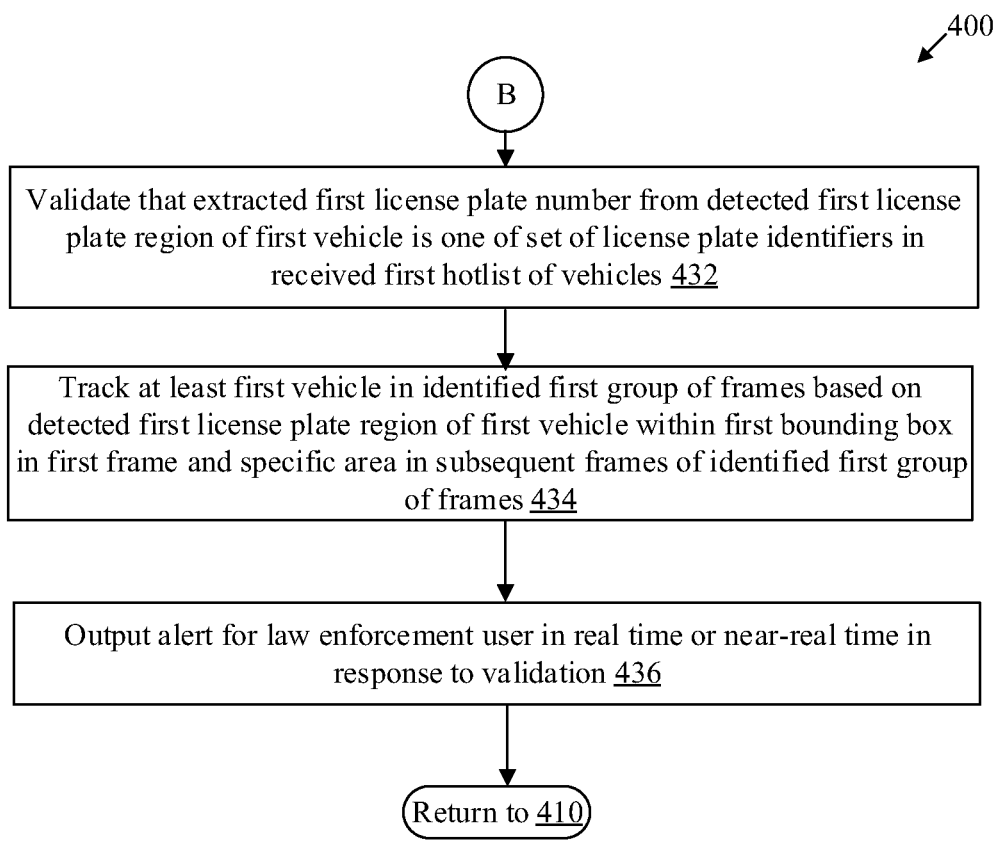

FIGS. 4A, 4B, and 4C collectively, depict a flowchart that illustrates an exemplary method for vehicle tracking and license plate recognition, in accordance with an embodiment of the disclosure. With reference to FIGS. 4A, 4B, and 4C, there is shown a flowchart 400. The flow chart is described in conjunction with FIGS. 1, 2, 3A, and 3B. The method starts at 402 and proceeds to 404.

At 404, a sequence of image frames (e.g., the sequence of image frames 114) that includes a plurality of different vehicles may be captured. The image sensor 104 may be configured to capture the sequence of image frames 114 from the field-of-view 110 of the image sensor 104. In one example, the sequence of image frames 114 may be a live video.

At 406, a first hotlist of vehicles comprising at least a set of license plate identifiers of a set of vehicles may be received. The control circuitry 202 may be configured to receive the first hotlist of vehicles via the network interface 212.

At 408, the captured sequence of image frames may be grouped into a plurality of groups of frames (e.g., the plurality of groups of frames 116). The control circuitry 202 may be configured to group the sequence of image frames into the plurality of groups of frames in a GOP structure using the deep learning engine 208.

At 410, a plurality of vehicle regions of the plurality of different vehicles may be detected within the captured sequence of image frames. The control circuitry 202 may be configured to detect the plurality of vehicle regions of the plurality of different vehicles within the captured sequence of image frames.

At 412, a first group of frames (e.g., the first group of frames 116A) may be identified from the captured sequence of image frames that belong to the first vehicle 112 of the plurality of different vehicles. The control circuitry 202 may be configured to identify the first group of frames from the captured sequence of image frames that belong to the first vehicle 112 of the plurality of different vehicles.

At 414, a first bounding box (e.g., the first bounding box 122A) may be generated on the first vehicle region within a first frame (e.g., the first frame 118A) of the identified first group of frames. The object detector 204 may be configured to generate the first bounding box on the first vehicle region within the first frame of the identified first group of frames. The first bounding box may be indicative of a spatial position of the first vehicle 112 in the first frame.

At 416, a first license plate region (e.g., the first license plate region 124A) of the first vehicle 112 may be detected within the first bounding box in the first frame. The control circuitry 202 may be configured to detect the first license plate region of the first vehicle within the first bounding box in the first frame using the deep learning engine 208.

At 418, a first set of points (e.g., the first set of points 126A) demarked at four corners of the first license plate region of the first vehicle 112 may be generated within the first bounding box in the first frame and the specific area in subsequent frames of the identified first group of frames. The image point generator 206 may be configured to generate the first set of points demarked at four corners of the first license plate region of the first vehicle within the first bounding box in the first frame and the specific area in subsequent frames of the identified first group of frames. The first set of points demarked at four corners of the first license plate region may also be referred to as a wide image crop operation, where the image portion demarked by the first set of points may be extracted by a LSTM based OCR. In some embodiments, a second set of points (e.g., the second set of points 128A) may be generated to encapsulate alphanumeric characters of the first license plate region of the first vehicle 112. The second set of points may be demarked within the first set of points. The second set of points demarked at four corners of the alphanumeric characters of first license plate region may also be referred to as a narrow image crop operation, where the image portion demarked by the second set of points may be extracted by a LSTM based OCR. In some embodiments, the control circuitry 202 may be further configured to compare a position of each point of the first set of points in the first frame with a corresponding position of each point of corresponding first set of points in a second frame (e.g., the second frame 118B) of the identified first group of frames, based on a specified planar point matching technique, such as coplanarity constraint. An affine transformation function may be determined based on a difference between the position of each point of the first set of points in the first image and the corresponding position of each point of the corresponding first set of points in the second frame.

At 420, the first license plate region of the first vehicle 112 may be detected within a specific area in the second frame that lie after the first frame of the identified first group of frames, based on a reference of the spatial position of the first bounding box of the first vehicle 112 in the first frame. The control circuitry 202 may be configured to determine a resemblance between the first license plate region of the first frame and license plate region within the specific area (i.e., inferred bounding box of first vehicle 112) in the second frame of the identified first group of frames using a trained CNN regression model, such as the deep learning engine 208.

At 422, the spatial position of the first bounding box of the first vehicle 112 may be updated for the second frame of the identified group of frames, based on the detected first license plate region of the first vehicle in the second frame of the identified first group of frames and the affine transformation function. The control circuitry 202 may be configured to update the spatial position of the first bounding box of the first vehicle 112 for the second frame of the identified group of frames.

At 424, the first license plate region of the first vehicle may be detected within a specific area in subsequent frames of the identified first group of frames, based on a reference of the spatial position of the first bounding box of the first vehicle in the previous image frame (e.g., I frame or P frame). The control circuitry 202 may be configured to batch detect the first license plate region of the first vehicle within a specific area in subsequent frames of the identified first group of frames using the trained CNN regression model, such as the deep learning engine 208. In accordance with an embodiment, an ellipse of uncertainty may be derived within the first bounding box using at least a location of the first license plate region in the previous frame, such as the first frame or the second frame. The first license plate region of the first vehicle may then be tracked within a specific area in subsequent frames of the identified first group of frames, further based on the derived ellipse of uncertainty such that the track of the first license plate region within the specific area in subsequent frames is independent of occlusion and license plate edge artifacts.

At 426, a first license plate number may be extracted by OCR from the detected first license plate region of the first vehicle from the first frame. The control circuitry 202 may be configured to extract, by OCR, the first license plate number from the detected first license plate region of the first vehicle 112 from the first frame.

At 428, a second license plate number may be extracted by OCR, from the detected first license plate region of the first vehicle from the second frame of the identified first group of frames. The control circuitry 202 may be configured to extract, by OCR, second license plate number from the detected first license plate region of the first vehicle 112 from the second frame of the identified first group of frames.

At 430, it may be verified that the first bounding box and the detected first license plate region belongs to the first vehicle based on a comparison of the extracted OCR results for the first frame and the second frame. The control circuitry 202 may be configured to verify that the first bounding box and the detected first license plate region belongs to the first vehicle.

At 432, it may be validated that the extracted first license plate number from the detected first license plate region of the first vehicle is one of the set of license plate identifiers in the received first hotlist of vehicles. The control circuitry 202 may be configured to validate that the extracted first license plate number from the detected first license plate region of the first vehicle is one of the set of license plate identifiers in the received first hotlist of vehicles.

At 434, at least the first vehicle 112 in the identified first group of frames may be tracked based on the detected first license plate region of the first vehicle within the first bounding box in the first frame and the specific area in subsequent frames of the identified first group of frames. The control circuitry 202 may be configured to track at least the first vehicle 112 in the identified first group of frames, where the tracking may be continued in subsequent frames of the first group of frames based on the validation at 432.

At 436, an alert may be outputted for a law enforcement user in a real time or a near-real time in response to the validation. The control circuitry 202 may be configured to communicate a control signal to the I/O device 214 to output the alert. The control may return to 410, where a new group of frames may be processed based on new frames captured by the image sensor 104.

Various embodiments of the disclosure may provide a non-transitory computer readable medium and/or storage medium, and/or a non-transitory machine readable medium and/or storage medium having stored thereon, a machine code and/or a set of instructions executable by a machine, such as the electronic device 102, and/or a computer. The set of instructions in the electronic device 102 may cause the machine and/or computer to perform the operations that comprise capture of a sequence of image frames that includes a plurality of different vehicles. A first group of frames may be identified from the captured sequence of image frames that belong to a first vehicle (such as the first vehicle 112) of the plurality of different vehicles. A first bounding box may be generated on a first vehicle region within a first frame of the identified first group of frames, where the first bounding box may be indicative of a spatial position of the first vehicle in the first frame. A first license plate region of the first vehicle may be detected within the first bounding box in the first frame. The first license plate region of the first vehicle may be detected within a specific area in subsequent frames of the identified first group of frames, based on a reference of the spatial position of the first bounding box of the first vehicle in the first frame. At least the first vehicle may be tracked in the identified first group of frames based on the detected first license plate region of the first vehicle within the first bounding box in the first frame and the specific area in subsequent frames of the identified first group of frames.

Various embodiments of the present disclosure may be found in an electronic device (such as the electronic device 102 (FIG. 1)) for vehicle tracking based on the GOP structure. The electronic device 102 may include an image sensor (such as the image sensor 104 (FIG. 1)), and a control circuitry (such as the control circuitry 202 (FIG. 2)). The image sensor 104 may be configured to capture a sequence of image frames that includes a plurality of different vehicles. The control circuitry may be configured to identify a first group of frames from the captured sequence of image frames that belong to a first vehicle of the plurality of different vehicles. The control circuitry may be further configured to generate a first bounding box (e.g. the first bounding box 122A (FIG. 1)) on a first vehicle region within a first frame (for e.g. the first frame 118A (FIG. 1)) of the identified first group of frames, where the first bounding box is indicative of a spatial position of the first vehicle in the first frame. The control circuitry may be further configured to detect a first license plate region of the first vehicle within the first bounding box in the first frame. The control circuitry may be further configured to detect the first license plate region of the first vehicle within a specific area in subsequent frames of the identified first group of frames, based on a reference of the spatial position of the first bounding box of the first vehicle in the first frame. Finally, the control circuitry may be further configured to track at least the first vehicle in the identified first group of frames based on the detected first license plate region of the first vehicle within the first bounding box in the first frame and the specific area in subsequent frames of the identified first group of frames.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. An electronic device, comprising:
an image sensor configured to capture a sequence of image frames that includes a plurality of vehicles; and
control circuitry configured to:
identify a group of frames from the captured sequence of image frames, wherein the identified group of frames is associated with a
vehicle of the plurality of vehicles;
generate a bounding box on a vehicle region within a
first frame of the identified group of frames, wherein
the bounding box is indicative of a spatial position of
the vehicle in the first frame;
detect a first license plate region of the vehicle within
the first bounding box in the first frame;
detect the first license plate region of the vehicle within
a first specific area in subsequent frames of the
identified group of frames, based on
a reference of the spatial position of the bounding
box of the vehicle in the first frame;
a resemblance between the first license plate region
of the first frame and a respective second license
plate region within the first specific area in the
subsequent frames of the identified group of
frames, and
a trained first neural network model, wherein
the first license plate region is detected in a batch;
and
track at least the vehicle in the identified group of
frames based on
the detected first license plate region of the vehicle
within the bounding box in the first frame, and
the first specific area in the subsequent frames of the
identified group of frames.

2. The electronic device of claim 1, wherein
the control circuitry is further configured to detect a
plurality of vehicle regions of the plurality of vehicles
within the captured sequence of image frames.

3. The electronic device of claim 1, wherein
the control circuitry is further configured to generate a
first set of points demarked at four corners of
the first license plate region of the vehicle within the
bounding box in the first frame, and
the first specific area in subsequent frames of the
identified group of frames.

4. The electronic device of claim 3, wherein
the control circuitry is further configured to generate a
second set of points within the first set of points, and
the second set of points is demarked within the first set of
points to encapsulate alphanumeric characters of the
first license plate region of the vehicle.

5. The electronic device of claim 3, wherein
the control circuitry is further configured to compare a
position of each point of the first set of points in the first
frame with a corresponding position of each point of
corresponding first set of points in a second frame of
the identified group of frames, based on a specified
planar point matching technique.

6. The electronic device of claim 3, wherein
the control circuitry is further configured to determine an
affine transformation function based on a difference
between a position of each point of the first set of points
in the first frame and a corresponding position of each
point of a corresponding first set of points in a second
frame of the identified group of frames.

7. The electronic device of claim 6, wherein
the control circuitry is further configured to update the
spatial position of the bounding box of the vehicle for
the second frame of the identified group of frames,
based on
the detected first license plate region of the vehicle in
the second frame of the identified group of frames,
and
the affine transformation function.

8. The electronic device of claim 1, wherein the control
circuitry is further configured to:
derive an ellipse of uncertainty within the bounding box
based on at least a location of the first license plate
region in the first frame; and
track the first license plate region of the vehicle within a
second specific area in subsequent frames of the identified group of frames, based on the derived ellipse of
uncertainty, wherein
the tracked first license plate region within the second
specific area in the subsequent frames is independent
of occlusion and license plate edge artifacts.

9. The electronic device of claim 1, wherein the control
circuitry is further configured to:
extract, by optical character recognition (OCR), a first
license plate number from the detected first license
plate region of the vehicle from the first frame;
extract, by the OCR, a second license plate number from
the detected first license plate region of the vehicle
from a second frame of the identified group of frames;
and
verify that each of the bounding box and the detected first
license plate region corresponds to the vehicle, wherein
the verification is based on a comparison of the extracted
first license plate number and the extracted second
license plate number.

10. The electronic device of claim 9, wherein the control
circuitry is further configured to receive a hotlist of vehicles
comprising at least a set of license plate identifiers of a set
of vehicles.

11. The electronic device of claim 10, wherein the control
circuitry is further configured to validate that the extracted
first license plate number from the detected first license plate
region of the vehicle is one of the set of license plate
identifiers in the received hotlist of vehicles.

12. The electronic device of claim 11, wherein
the control circuitry is further configured to output an alert
to a law enforcement user in one of a real time or a
near-real time, and
the alert is output based on the validation.

13. A method, comprising:
in an electronic device that includes control circuitry and
an image sensor:
capturing, by the image sensor, a sequence of image
frames that includes a plurality of vehicles;
identifying, by the control circuitry, a group of frames
from the captured sequence of image frames,
wherein
the identified group of frames is associated with a
vehicle of the plurality of vehicles;
generating, by the control circuitry, a bounding box on
a vehicle region within a first frame of the identified
group of frames, wherein
the bounding box is indicative of a spatial position of
the vehicle in the first frame;
detecting, by the control circuitry, a first license plate
region of the vehicle within the bounding box in the
first frame;
detecting, by the control circuitry, the first license plate
region of the vehicle within a specific area in subsequent frames of the identified group of frames,
based on a reference of the spatial position of the bounding box of the vehicle in the first frame;
a resemblance between the first license plate region of the first frame and a respective second license plate region within the specific area in the subsequent frames of the identified group of frames, and
a trained first neural network model, wherein the first license plate region is detected in a batch; and
tracking, by the control circuitry, at least the vehicle in the identified group of frames based on
the detected first license plate region of the vehicle within the bounding box in the first frame, and
the specific area in the subsequent frames of the identified group of frames.

14. The method of claim 13, further comprising detecting, by the control circuitry, a plurality of vehicle regions of the plurality of vehicles within the captured sequence of image frames.

15. The method of claim 13, further comprising generating, by the control circuitry, a first set of points demarked at four corners of
the first license plate region of the vehicle within the bounding box in the first frame, and
the specific area in the subsequent frames of the identified group of frames.

16. The method of claim 15, further comprising generating, by the control circuitry, a second set of points within the first set of points, wherein
the second set of points are demarked within the first set of points to encapsulate alphanumeric characters of the first license plate region of the vehicle.

17. The method of claim 13, further comprising:
in the control circuitry:
extracting, by optical character recognition (OCR), a first license plate number from the detected first license plate region of the vehicle from the first frame;
extracting, by the OCR, a second license plate number from the detected first license plate region of the vehicle from a second frame of the identified group of frames; and
verifying that each of the bounding box and the detected first license plate region correspond to the vehicle, wherein
the verification is based on a comparison of the extracted first license plate number and the extracted second license plate number.

18. The method of claim 17, further comprising validating, by the control circuitry, that the extracted first license plate number from the detected first license plate region of the vehicle is one of a set of license plate identifiers in a hotlist of vehicles.

19. An electronic device, comprising:
an image sensor configured to capture a sequence of image frames that includes a plurality of vehicles; and
control circuitry configured to:
identify a group of frames from the captured sequence of image frames, wherein
the identified group of frames is associated with a vehicle of the plurality of vehicles;
generate a bounding box on a vehicle region within a first frame of the identified group of frames, wherein
the bounding box is indicative of a spatial position of the vehicle in the first frame;
detect a first license plate region of the vehicle within the bounding box in the first frame;
derive an ellipse of uncertainty within the bounding box based on at least a location of the first license plate region in the first frame;
detect the first license plate region of the vehicle within a first specific area in subsequent frames of the identified group of frames, based on a reference of the spatial position of the bounding box of the vehicle in the first frame;
track at least the vehicle in the identified group of frames based on
the detected first license plate region of the vehicle within the bounding box in the first frame, and
the first specific area in the subsequent frames of the identified group of frames; and
track the first license plate region of the vehicle within a second specific area in the subsequent frames of the identified group of frames, based on the derived ellipse of uncertainty, wherein
the tracked first license plate region within the second specific area in the subsequent frames is independent of occlusion and license plate edge artifacts.

* * * * *